United States Patent
Seminel

(10) Patent No.: US 10,457,402 B2
(45) Date of Patent: Oct. 29, 2019

(54) DEVICE FOR DE-ICING A ROTOR BLADE, ROTOR BLADE PROVIDED WITH SUCH A DEVICE, ROTOR, TURBOMACHINE AND AIRCRAFT

(71) Applicant: RATIER FIGEAC, Figeac (FR)

(72) Inventor: Bruno Seminel, Lissac-et-mouret (FR)

(73) Assignee: RATIER FIGEAC, Figeac (FR)

( * ) Notice: Subject to any disclaimer, the term of this patent is extended or adjusted under 35 U.S.C. 154(b) by 193 days.

(21) Appl. No.: 15/383,173

(22) Filed: Dec. 19, 2016

(65) Prior Publication Data

US 2017/0174350 A1 Jun. 22, 2017

(30) Foreign Application Priority Data

Dec. 21, 2015 (FR) ...................................... 15 63002

(51) Int. Cl.
| | | |
|---|---|---|
| *B64D 15/12* | (2006.01) | |
| *F01D 25/02* | (2006.01) | |
| *F03D 80/40* | (2016.01) | |
| *H05B 3/00* | (2006.01) | |

(52) U.S. Cl.
CPC .............. *B64D 15/12* (2013.01); *F01D 25/02* (2013.01); *F03D 80/40* (2016.05); *H05B 3/0014* (2013.01)

(58) Field of Classification Search
CPC ......... B64D 15/12; F03D 80/40; F01D 25/02; H05B 3/0014
USPC .......................................................... 416/39
See application file for complete search history.

(56) References Cited

U.S. PATENT DOCUMENTS

| | | | | |
|---|---|---|---|---|
| 2,503,457 A * | 4/1950 | Speir | ...................... | B64D 15/12 219/507 |
| 2,743,890 A * | 5/1956 | La Rue | .................. | B64D 15/12 219/202 |
| 2,757,273 A * | 7/1956 | Taylor | ................... | B64D 15/12 219/528 |
| 2,992,317 A * | 7/1961 | Hoffman | ............... | B64D 15/12 219/202 |
| 3,420,476 A | 1/1969 | Volkner et al. | | |

(Continued)

FOREIGN PATENT DOCUMENTS

| | | |
|---|---|---|
| EP | 2 392 777 A2 | 12/2011 |
| GB | 2 428 275 A | 1/2007 |

(Continued)

OTHER PUBLICATIONS

FR Search Report, dated Sep. 20, 2016, from corresponding FR application.

*Primary Examiner* — Aaron R Eastman

(74) *Attorney, Agent, or Firm* — Ipsilon USA, LLP

(57) ABSTRACT

A de-icing device is provided for at least one surface portion of a rotor blade liable to be covered with a layer of ice. The device includes: at least one first heating device adapted to permit detachment of at least part of the layer of ice, as well as at least one second heating device including heating elements extending facing only part of the surface portion so as to circumscribe at that location closed-contour zones of the surface portion. The heating elements of the second heating device are adapted to cause breaking of the ice through the thickness of the layer of ice, and the first heating device extends at least partly facing the inside of the closed-contour zones.

19 Claims, 3 Drawing Sheets

(56) References Cited

U.S. PATENT DOCUMENTS

Figure 1:
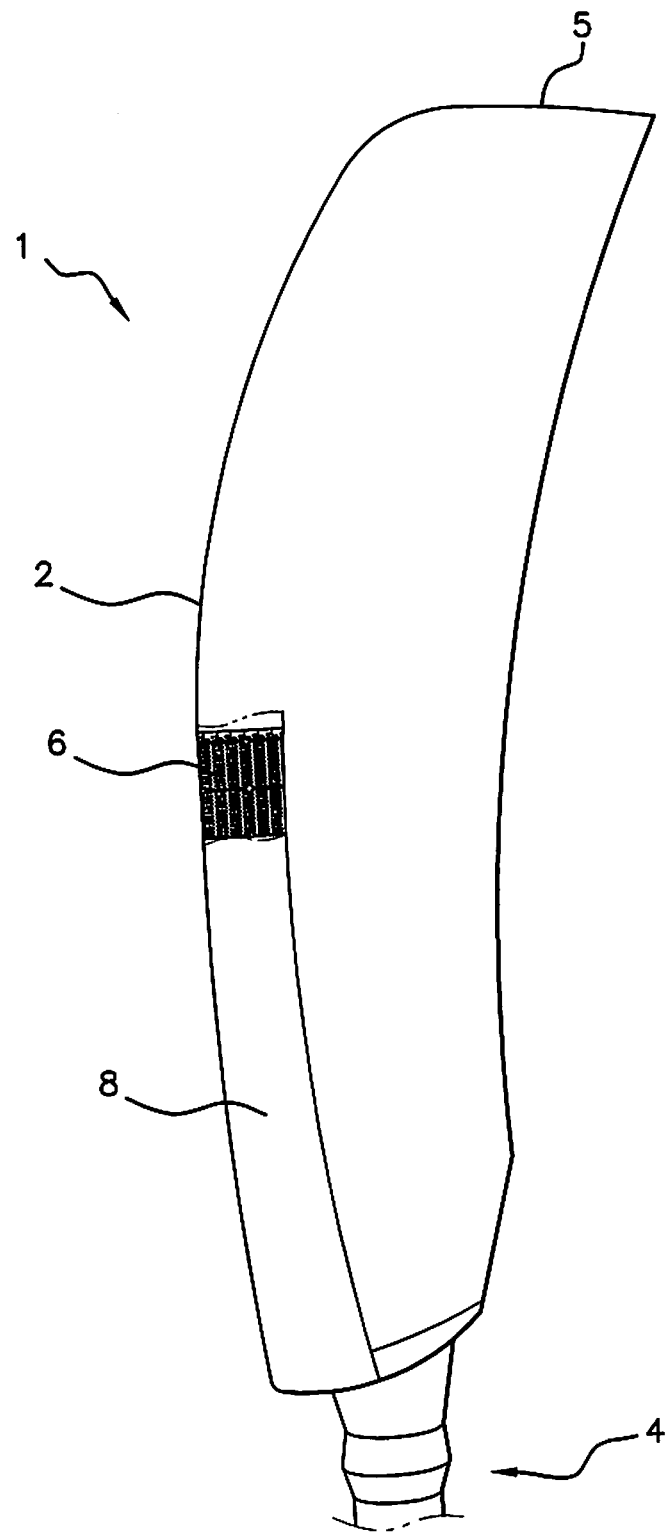

| | | | | |
|---|---|---|---|---|
| 4,386,749 | A | * | 6/1983 | Sweet ................... B64D 15/12 244/134 D |
| 5,475,204 | A | | 12/1995 | Giamati et al. |
| 6,227,492 | B1 | * | 5/2001 | Schellhase ............ B64D 15/12 244/134 D |
| 6,279,856 | B1 | * | 8/2001 | Rutherford ........... B64D 15/14 244/134 D |
| 7,278,610 | B2 | * | 10/2007 | Giamati .................. B64C 9/24 244/134 D |
| 8,931,740 | B2 | * | 1/2015 | Nordin ..................... B64C 3/20 244/134 D |
| 9,100,994 | B2 | * | 8/2015 | Orawetz ............... B64D 15/12 |
| 2006/0043240 | A1 | | 3/2006 | Hindel et al. |
| 2011/0290784 | A1 | | 12/2011 | Orawetz et al. |
| 2012/0001026 | A1 | | 1/2012 | Caruel |

FOREIGN PATENT DOCUMENTS

| | | |
|---|---|---|
| WO | 2010/049063 A2 | 5/2010 |
| WO | 2011/127996 A1 | 10/2011 |

* cited by examiner

DEVICE FOR DE-ICING A ROTOR BLADE, ROTOR BLADE PROVIDED WITH SUCH A DEVICE, ROTOR, TURBOMACHINE AND AIRCRAFT

The invention relates to a device for de-icing a rotor blade. It relates to a rotor blade provided with such a de-icing device. It also relates to a turbomachine comprising such a blade and to an aircraft and wind turbine comprising such a turbomachine.

On the ground, under meteorological conditions which are favourable to the formation of frost, or in flight, ice is liable to accumulate on the surface of the blades of a rotor of an aircraft, for example. The accumulation of this ice on an aircraft, in particular on the surface of the blades of a rotor, leads to a considerable deterioration in the output of the rotor. Furthermore, even when it does not completely immobilise the aircraft, the accumulation of ice poses numerous problems in terms of mass, mass distribution or even disruption to measuring elements.

The accumulation of ice on the surface of the blades of a rotor, either when inoperative or in operation, is also liable to pose numerous problems associated with the dimensioning and the efficiency thereof.

WO 2010/049063 and US 2011/0290784 describe a de-icing device comprising a base heating layer permanently supplied with electric current and an additional heating layer supplied with electric current only during certain periods. When the additional heating layer is supplied with electric current, the electric current is greater than the supply current of the base heating layer.

Numerous de-icing devices using a circulation of hot air below the surface or even electric resistors distributed in contact with the surface of different parts of an aircraft or of a wind turbine have already been proposed for causing the ice to melt and/or avoiding formation and accumulation thereof. Inflatable pneumatic devices are also known, the periodic activation of which permits frost accumulated on the surface of different parts of an aircraft or wind turbine to be broken.

However, although permitting the removal of the ice with some degree of efficiency, the prior art devices generally cause the formation of ice debris of considerable and uncontrolled size, liable to damage other parts of the aircraft or of the wind turbine. The ejection of such pieces of ice is even more dangerous in the case of rotor blades in operation, since the pieces of ice are then thrown under the effect of centrifugal force.

The inventor has determined that it would be desirable to be able to remove this ice while being capable of controlling the size and path of the pieces of ice removed in order to avoid them damaging the aircraft itself or any other part or injuring anyone located in their path.

The invention thus aims to propose a de-icing device permitting the disadvantages of the known de-icing devices to be overcome.

The invention aims in particular to propose a device for de-icing a rotor blade, permitting:
  the accumulation of frost on the outer surface of a rotor blade of an aircraft or of a wind turbine to be prevented,
  the size and shape of the pieces of ice being detached from the surface of a rotor blade to be controlled,
  the size and mass of the means for protecting against the ice debris, which are provided on the outer surface of an aircraft, to be reduced and consequently a reduction in the total mass of an aircraft to be allowed,
  the distribution of the ice located on the surface of a blade as well as between the different blades of an aircraft engine to be balanced out and consequently any mass imbalance liable to lead to vibrations to be minimised.

Throughout the text, "ice" or "frost" designates water in solid form (or any mixture comprising water in solid form) liable to accumulate on an aerodynamic surface such as the fuselage, the airfoil or any other outer surface of an aircraft or of a wind turbine.

Throughout the text, "de-icing" designates the action of removing frost or ice from an aerodynamic surface but also the action consisting of preventing the formation ("anti-frosting") and/or accumulation of frost or ice on an aerodynamic surface such as a rotor blade of an aircraft or of a wind turbine.

Throughout the text, one of the two main faces of a blade which is adapted to create aspiration of the blade by the air circulating along the upper surface, from the leading edge to the trailing edge of the blade is designated in a traditional manner by "extrados". Similarly, the main face opposite to the upper surface, which is adapted to create a thrust of the blade by the air circulating along the lower surface, from the leading edge to the trailing edge is designated by "intrados".

Furthermore, throughout the text, an end of the blade located on the side where this blade is attached to a hub is designated by "root" and the end of the blade located opposite to the blade root is designated by "free end".

Throughout the text, a direction passing through the leading edge and the trailing edge of the blade is designated by "chord". Similarly, a direction substantially parallel to a straight line connecting the blade root to the free end of the blade is designated by "longitudinal". The "span" of the blade represents the maximum distance between the blade root and the free end of the blade. Moreover, the minimum distance at any point between the upper surface and the lower surface is designated by "thickness".

Throughout the text, the front and rear are defined with respect to the leading and trailing edges of the blade: a part located at the front is on the leading edge side and a part towards the rear is located on the trailing edge side.

The invention thus relates to a de-icing device for at least one surface portion of a rotor blade liable to be covered with a layer of ice, said device comprising:
  at least one first heating device adapted to permit detachment of at least part of said layer of ice in contact with said surface portion of the rotor blade, characterised in that it further comprises:
  at least one second heating device comprising heating elements extending facing only part of said surface portion so as to circumscribe at that location closed-contour zones of said surface portion, and in that:
  the heating elements of the second heating device are adapted to cause breaking of the ice depending on said thickness of said ice layer,
  the first heating device extends at least partly facing the inside of said closed-contour zones of said second heating device.

The heating elements of the second heating device are adapted to weaken the adhesion of the ice to said surface portion so as to cause breaking of the ice depending on said thickness of said ice layer, permitting detachment of the ice from said surface portion along each heating element of the second device, in particular under the action of centrifugal force during rotation of the rotor blades. In fact, by locally increasing the temperature, i.e. along each heating element of the second device, and doing so without needing to melt the ice through its thickness, the connection between the ice and said surface portion of the rotor blade is weakened.

The inventor has unexpectedly observed that by combining the second heating device defining closed-contour zones with a first heating device extending inside each of said closed-contour zones of the second heating device, the ice accumulated on a rotor blade is removed effectively while controlling the size and mass of each of the pieces of ice debris formed. In fact, on the one hand, the second heating element defines breaking contours of the ice through its thickness and, on the other hand, the heating elements of the first heating device distributed within each closed-contour zone of the second heating device weaken the connection between the ice and said surface portion of the rotor blade, which will suffice to permit breaking and detachment of pieces of ice, the size thereof not exceeding the size of the closed-contour zones defined by said second heating device, under the effect of centrifugal force during rotation of the rotor blades.

The heating elements of the second heating device permit, by the Joule effect, an increase in the temperature of the ice liable to be accumulated on said surface portion, and in particular an increase in the temperature of the ice which is located at the interface between said surface portion and the ice, so as to reduce the thickness of the ice facing each of the heating elements of said second heating device. The heating elements are advantageously in elongate form and have a small cross-section (i.e. a thickness and width smaller than their length). In an advantageous manner and in accordance with the invention, the heating elements of the second heating device are filiform (or even liniform). In particular, in an advantageous manner and in accordance with the invention, said heating elements of the second heating device are mono-filiform.

The first heating device and the second heating device can be distinct and superimposed one above the other (the first heating device being disposed above the second heating device or vice versa) for example on said surface portion of the blade or form part of a single network of heating elements connected to one another and be included, for example, in a single unique layer forming said de-icing device.

The first heating device thus extends inside or at least at the base of the closed-contour zones circumscribed by the heating elements of the second heating device, i.e. the first heating device is located in a space produced by a projection of the closed-contour zone and of which the generatrix is the normal to said surface portion (in a virtual cylinder, for example, in the case where said closed-contour zone is circular).

The heating elements of the second heating device can extend over said surface portion so as to define closed-contour zones of any shape, regular or irregular, with straight portions and/or curved portions. In particular, in an advantageous manner and in accordance with the invention, the heating elements of the second heating device extend in a pattern selected from the group formed of polygons and closed curves. More particularly, in an advantageous manner and in accordance with the invention, said heating elements of the second heating device extend in a pattern selected from the group formed of convex polygons. The heating elements extending over said surface portion define, for example, closed-contour zones in the form of a triangle, square, pentagon, hexagon, octagon . . . . In another embodiment variation of a device in accordance with the invention, the heating elements of the second heating device extend in a pattern selected from the group formed of circles and ellipses.

In particular, in an advantageous manner and in accordance with the invention, said heating elements of the second heating device extend in an identical pattern, each closed-contour zone of said second heating device representing said pattern. The second heating device can be formed, for example, of heating elements extending so as to represent squares or even hexagons of the same size (same sides) disposed one beside another or even representing circles with the same diameter.

Furthermore, in an advantageous manner and in accordance with the invention, the closed-contour zones of said second heating device are adjacent to one another and separated from one another at least by said heating elements, each heating element separating at least two closed-contour zones. The second heating device can be formed, for example, of heating elements extending so as to represent squares of the same size (same sides) adjacent to one another (by each of their sides) or even representing circles of the same diameter also adjacent to one another.

Each pattern formed by the heating elements of the second heating device being disposed adjacent to one another, they form what may be called a lattice or a network of heating elements electrically connected to one another. In an advantageous manner and in accordance with the invention, said heating elements of the second heating device extend in the form of at least one lattice, named second heating lattice, comprising cells, each cell of said second heating lattice defining a closed-contour zone. In an advantageous manner and in accordance with the invention, said heating elements of the second heating device are electrical resistors and extend in the form of at least one lattice of electrical resistors, named second heating lattice, comprising cells, each cell of said second heating lattice defining a closed-contour zone.

The first heating device can be in the form of a thin heating film or sheet (for example, a film of polymeric material within which extend metallic elements or even carbon fibres, for example), or can comprise heating elements distributed over said surface portion of a rotor blade. In one embodiment variation according to the invention, the first heating device is at least partly formed by a thin heating film. In another embodiment variation according to the invention, the first heating device also comprises heating elements distributed over said surface portion of a rotor blade and permitting, by the Joule effect, the temperature of the ice liable to be accumulated on said surface portion to be increased, and in particular the temperature of the ice located at the interface between said surface portion and the ice to be increased. The heating elements of the first heating device are advantageously in elongate form and have a small cross-section (i.e. a thickness and width smaller than their length). In an advantageous manner and in accordance with the invention, the heating elements of the first heating device are filiform (or even liniform). The heating elements of the first heating device extend over said surface portion and inside each of the closed-contour zones defined by said second heating device so as to avoid ice—the contours of which will break in patterns formed by the heating elements of the second heating device—adhering to the surface portion located inside each of these closed-contour zones and preventing it leaving the surface of the rotor blade. The heating elements of the first heating device can extend over said surface portion, forming any pattern such as polygons and closed curves, as for the heating elements of the second heating devices or even forming zigzags in a serpentine manner.

In an advantageous manner and in accordance with the invention, said heating elements of the first heating device and/or of the second heating device extend in an identical or variable pattern. For example, it may be a single pattern repeated periodically over the planar surface portions of the blade and the contours of which can be different and adapted to the geometry of the surface of the blade in curved zones of the blade (leading edge, blade root . . . ).

In an advantageous manner and in accordance with the invention, each closed-contour zone occupies a predetermined surface and said first heating device is in the form of at least one lattice of electrical resistors, named first heating lattice, comprising cells each having a surface smaller than the surface of each of the closed-contour zones of said second heating device.

In particular, in an advantageous manner and in accordance with the invention, it is possible to control the electric power within the first heating device and the second heating device, particularly by varying the electrical intensity, the resistance of the heating elements (particularly by the variation in the cross-section and/or the length of the resistors) and the amount of coverage of the first heating device and of the second heating device.

In particular, in an advantageous manner and in accordance with the invention, said heating elements of the second heating device are electrical resistors.

In an advantageous manner and in accordance with the invention, said second heating device comprises a supply of electricity for the heating elements at an electric power level, said first heating device comprises a supply of electricity for the first heating lattice at an electric power level, the electric power dissipated per unit area of the second heating lattice being greater than the electric power dissipated per unit area of the first heating lattice. Thus, the heating procured by the second heating lattice is in places greater than the heating procured by the first heating lattice, which makes it possible to more significantly weaken the connection between the ice and the surface portion of the blade according to the contours of said closed-contour zones defined by the second heating lattice. In particular, in an advantageous manner and in accordance with the invention, the heating elements of the first heating device and the heating elements of the second heating device are supplied with electricity simultaneously. In other words, the two devices act at the same time, concomitantly, without it being necessary to periodically cut off the supply of electricity to one of the two devices.

In one embodiment variation of a de-icing device according to the invention, the current density in the conductive lattice can vary, on said surface portion, between the blade root and the free end of the blade as well as between the leading edge and the trailing edge of the blade. For example, it is possible to ensure that the current density, in only one or in each of the two heating lattices, increases in the direction of the blade root and/or trailing edge. In one embodiment variation, in an advantageous manner and in accordance with the invention, the electric power dissipated by the first heating device and/or the second heating device varies depending on the distance between the heating elements of the second heating device and the blade root. In one embodiment variation, in an advantageous manner and in accordance with the invention, the electric power dissipated by the first heating device and/or the second heating device varies depending on the distance between the heating elements of the second heating device and the leading edge.

In an advantageous manner, in a rotor blade in accordance with the invention, said first heating device comprises a supply of electricity for the heating elements at a level of electric power supplied varying depending on the distance between them and the blade root, in particular so that the power dissipated per unit area increases in the direction of the blade root where the centrifugal force is lower than at the end of the blade.

In an advantageous manner, in a rotor blade in accordance with the invention, said first heating device comprises a supply of electricity for the heating elements at a level of electric power supplied varying depending on the distance between them and the leading edge, in particular so that the power dissipated per unit area increases in the direction of the leading edge.

The thickness of the heating elements of the first heating device and of the second heating device can vary or be constant over the whole of said surface portion. In one particularly advantageous embodiment of a de-icing device in accordance with the invention, the heating elements of the first heating device and/or the heating elements of the second heating device extend in at least one housing recessed into said surface portion, so that the surface of the blade is stripped of any overthickness. In one particularly advantageous embodiment variation of a de-icing device in accordance with the invention, said housing can correspond substantially precisely to the surface portion on which the de-icing device extends (for example, if this device is only installed in a zone of the leading edge of a blade). In one embodiment variation of a de-icing device in accordance with the invention, housings provided in said surface portion could also form a network of channels reproducing, in a (hollow) conjugate form, the heating element patterns of the first heating device and/or of the second heating device. In another embodiment variation of a de-icing device in accordance with the invention, the heating elements of the first heating device and/or the heating elements of the second heating device protrude from the thickness of said surface portion. In each of these variations, the heating elements can be covered by a protective film protecting them from impacts and permitting a surface portion to be produced which is substantially smooth, i.e. has no unevenness. In yet another embodiment variation of a de-icing device in accordance with the invention, the heating elements of the first heating device and/or the heating elements of the second heating device extend below said surface portion in the inner structure of the blade but in such a way as to be able to transmit heat to the outer face of the blade.

On the other hand, the two lattices can be distinct and superimposed one on the other, the two lattices may or may not each have the same thickness. The two lattices can also be formed in a single layer with a constant thickness, the cross-section of the heating elements of the first and second heating lattices being able to vary so as to vary the electric power dissipated by each of the two lattices (the current being greater in an element with a greater cross-section and the Joule effect thus also being greater).

A thin protective and electrically insulating film can also be disposed over the heating devices and below the heating devices. It may, for example, be a neoprene film or a film of any other polymeric or elastomeric material, possibly comprising fibres such as glass fibres.

The invention relates to a rotor blade comprising at least one de-icing device in accordance with the invention.

The heating elements of the de-icing device can extend over all or part of the outer surface of the rotor blade. However, taking account of the centrifugal force to which the ice liable to be accumulated on the surface of the blade is subjected, the proximal portion of the blade and the portion of the blade disposed at the side of the leading edge are the portions on which ice is most difficult to remove. In an advantageous manner and in accordance with the invention, the de-icing device is installed so that the heating elements of the first and second heating devices are disposed at the leading edge of the blade and in particular in a proximal zone of said blade. In particular, in an advantageous manner and in accordance with the invention, the heating elements extend from the root of the blade to at least 25% of the total length of the blade and in particular to at least 40% of the total length of the blade.

The invention also relates to a turbomachine rotor comprising at least one blade in accordance with the invention.

The invention also relates to a turbomachine comprising at least one such rotor.

The invention also relates to an aircraft comprising at least one such turbomachine.

The invention also relates to a device, a turbomachine rotor, a turbomachine and an aircraft which are characterised in combination by all or some of the features mentioned above or below.

Figure 2A:
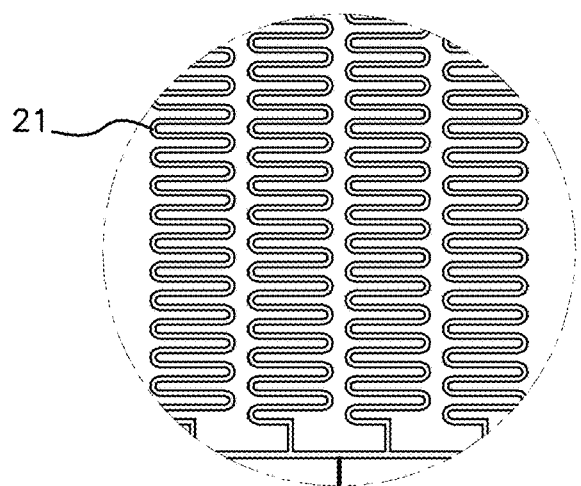
Figure 2B:
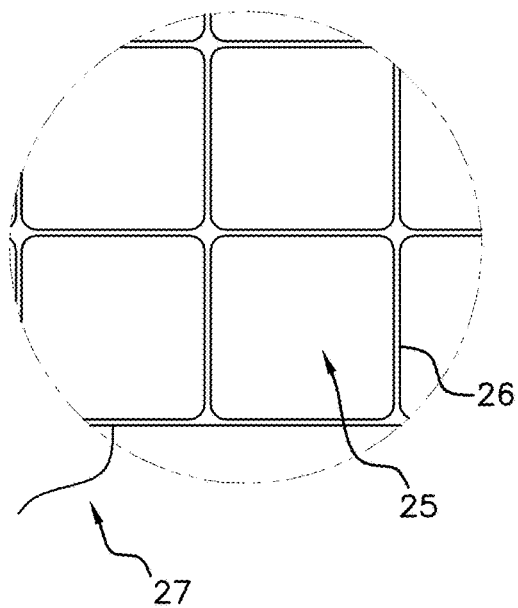
Figure 2C:
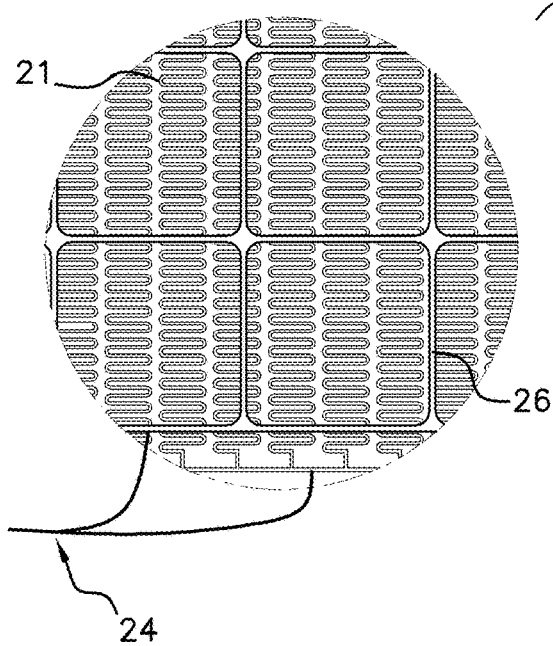
Figure 3A:
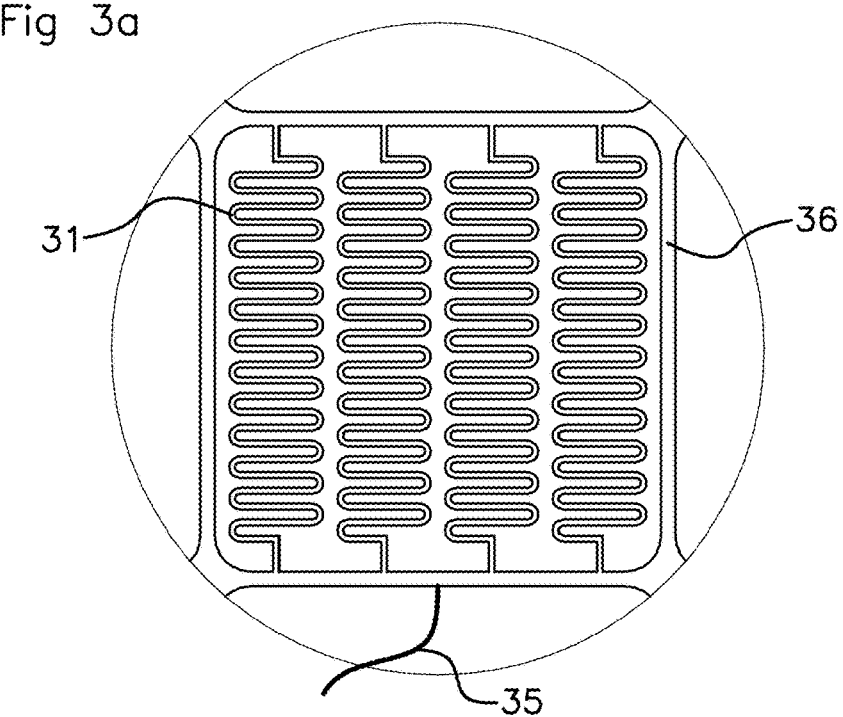
Figure 3B:
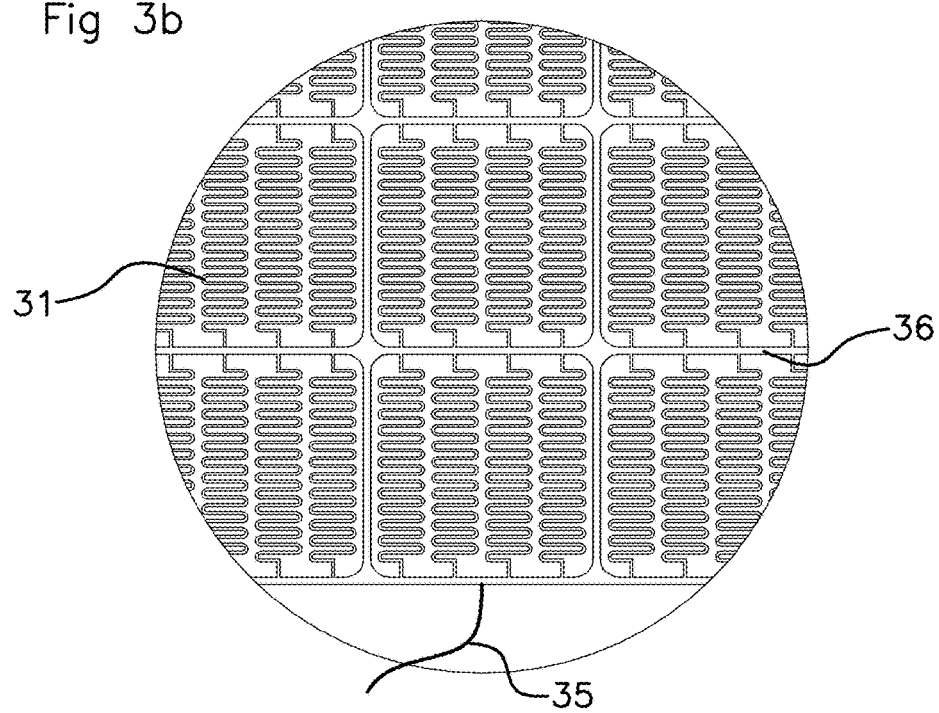

Other aims, features and advantages of the invention will become apparent upon reading the following description of one of its preferential embodiments given by way of non-limiting example and with reference to the attached figures in which:

FIG. 1 is schematic perspective view of a rotor blade provided with a de-icing device in accordance with the invention, FIG. 2a is schematic view of a first heating device of a de-icing device in accordance with the invention, FIG. 2b is schematic view of a second heating device of a de-icing device in accordance with the invention, FIG. 2c is schematic view of a first heating device and of a second heating device of a de-icing device in accordance with the invention, FIG. 3a is schematic view of a first heating device and of a second heating device of a de-icing device in accordance with the invention, FIG. 3b is schematic view of a first heating device and of a second heating device of a de-icing device in accordance with the invention.

A rotor blade 1 in accordance with the invention, illustrated in FIG. 1, is a rotor blade 1 of a turboprop engine of an aeroplane. The rotor blade 1 extends in a longitudinal direction from a proximal end, i.e. from the root 4 of the blade, to a distal end 5.

Despite the centrifugal force to which the ice which accumulates on the surface of the blade is subjected, the portion closest to the root of the blade and which is disposed on the side of the leading edge 2 of the blade is the portion on which the ice is most difficult to remove because the centrifugal force is weakest at that point. Thus, on the rotor blade 1 illustrated in FIG. 1, the de-icing device is disposed so that the heating elements of the first and second heating devices are disposed only at the leading edge 2 of the blade and in particular close to the blade root on a surface portion 8 of the rotor blade.

The de-icing device comprises a first heating device adapted to permit detachment of at least part of said layer of ice in contact with said surface portion 8 of the rotor blade. The de-icing device also comprises a second heating device comprising heating elements extending over only a part of said surface portion so as to circumscribe at that location closed-contour zones of said surface portion, the heating elements of the second heating device being adapted to cause breaking of the ice depending on the thickness of the layer of ice when the blade is rotating about the hub of a rotor. The first heating device extends at least partly inside said closed-contour zones of said second heating device.

The heating elements are formed, for example, of at least one material selected from among electrically conductive materials, in particular metallic materials such as copper, steel or aluminium, carbon fibres or any other composite material comprising electrically conductive fillers, for example in the form of nanotubes or nanoparticles . . . .

In FIG. 1, the zone 6 of the blade represents a portion of the surface portion 8 of the blade, the outer protective layer of which has been removed enabling the heating elements of the first heating device and of the second heating device to be seen.

In a first embodiment variation (FIGS. 2a to 2c), the first heating device and the second heating device are formed of a lattice of electrical resistors, the first and second lattices being electrically isolated from one another. FIG. 2a is a schematic view of a part of the first heating device, the heating elements of which are formed of different resistors 21 disposed in parallel. The resistors 21 of the first heating device are connected to an electricity supply source by an electrical connection 22. FIG. 2b is a schematic view of a part of the second heating device, the heating elements of which are formed of different resistors 26 forming a resistive lattice, each cell having a square pattern. Each cell of the second heating device defines a closed-contour zone 25. The resistors 26 of the second heating device are connected to an electricity supply source by an electrical connection 27, the electricity supply source may or may not be the same for the first heating device and the second heating device. A thin film formed of electrically insulating material (not illustrated in the figures) is disposed between the first lattice and the second lattice. It is, in particular, a film or fabric of polymeric or elastomeric material, for example of neoprene, possibly comprising fibres as reinforcement, such as glass fibres. A film of this type can also be disposed above the second heating device so as to protect the surface and the two heating devices from impacts without insulating them thermally. A film of this type can also be disposed below the first and second heating devices so as to electrically isolate the surface of the blade from the first and second heating devices. It is thus also possible to use three distinct insulating films, one below the first heating device, the second between the first heating device and the second heating device and the third above the second heating device.

In FIG. 2c, the two lattices, that forming the first heating device and that forming the second heating device, are superimposed so as to be disposed in contact with the surface of the blade 1, the second heating device being disposed above the first heating device. Of course, it is also possible, when the two heating devices are distinct, for the first heating device to be disposed above the second heating device. The first heating device and the second heating device are electrically isolated from one another, for example, by a thin, transparent, insulating film. The resistors 21 of the first heating device and the resistors 26 of the second heating device are connected to a single electricity supply source by an electrical connection 24.

The average power dissipated per unit area of the first heating device can be, for example, between 5 kW/m$^2$ and 50 kW/m$^2$ and the average power dissipated per unit area of the second heating device can be, for example, between 10 kW/m$^2$ and 500 kW/m$^2$. The average power dissipated per unit area of the first heating device is, for example 10 kW/m$^2$ and the average power dissipated per unit area of the second heating device is, for example, 100 kW/m².

In a second embodiment variation (FIGS. 3a and 3b), the first heating device and the second heating device are formed of a lattice of electrical resistors, the first and second lattices being electrically connected to one another. FIG. 3a is a schematic view of a cell of the second heating device, inside which are disposed heating elements of the first heating device. FIG. 3b is a schematic view of a plurality of cells of the second heating device, the heating elements of which are formed of different resistors 36 forming a resistive lattice, each cell having a square pattern. The resistors 36 of the second heating device form a resistive network, each cell being substantially square and adjacent by each of its sides to another neighbouring cell.

The heating elements of the first heating device are formed of different resistors 31 disposed in parallel within each closed-contour zone defined by the heating elements of the second heating device. The heating elements of the second heating device are formed of different resistors 36 of greater width than the resistors 31 of the first heating device. The thickness of the resistors 31 and 36 of the first heating device and of the second heating device is constant and identical over the whole surface portion of the blade on which the de-icing device is installed. The resistors 31 of the first heating device and the resistors 36 of the second heating device are connected to a single electricity supply source by an electrical connection 35.

A thin film can be disposed above and/or below heating devices. Such a film or fabric of polymeric or elastomeric material, for example of neoprene, can possibly comprise fibres as reinforcement, such as glass fibres. Such a film permits the heating devices to be protected from impacts and to be electrically isolated from the surface of the blade without insulating them thermally.

In each of the two preceding embodiment variations, the second heating device, forming cells in a pattern enabling closed-contour zones to be defined, is such that it permits a quantity of heat to be dissipated by the Joule effect, this quantity being greater than the quantity of heat dissipated by the Joule effect by the first heating device, the heating resistors of which are distributed within each of the closed-contour zones defined by the second heating device. Thus the heating resistors 26, 36 of the second heating device permit a temperature to be reached in the ice in contact with the surface portion, which is greater than the temperature of the ice facing the heating resistors 21, 31 of the first heating device. Consequently, the ice is rendered more fragile facing the heating resistors 26, 36 of the second heating device, which permits detachment of the ice at least partly depending on the contours of the zones defined by the heating resistors 26, 36 of the second heating device when the blade is rotated within a rotor. Furthermore, the detachment of such pieces of ice is also permitted by the fact that the adhesion between the ice and the surface portion 18 of the blade has been weakened by virtue of the heating resistors 21, 31 of the first heating device. In particular, it should be noted that the heating of the ice by the Joule effect does not serve to melt the ice but only to reduce the forces of adhesion between the ice and the surface portion 18. The combination of heating resistors 21, 31 of the first heating device and of the heating resistors 26, 36 of the second heating device thus permit de-icing of the portion 18 of the surface of the blade 1 while controlling the size and mass of the ice debris removed. Thus, it is possible to avoid ice debris of hazardous sizes from falling, the maximum size of the ice debris being limited to the size of the closed-contour zones defined by the heating elements of the second heating device.

The heating resistors 26, 36 of the second heating device do not need to be of greater width but can be of relatively small width. The liniform portions of the heating elements of the second heating device are in particular of a maximum width (or diameter) less than 1 cm, and in particular a width less than 0.5 cm.

In the two preceding embodiment variations, it is possible to control the electric power within the first heating device and the second heating device by varying the electrical intensity, the resistance of the heating elements (particularly by the variation in the cross-section and/or the length of the resistors) or even the amount of coverage of the electrical resistors. For example, in a lattice such that the electrical voltage is constant and in which the intensity depends on the resistance of the heating elements (and in which the electric power is proportional to $U^2/R$ (U representing the electrical voltage and R the resistance), it is possible to control the resistance of each of the heating elements of the first heating device and of the second heating device by using resistors 21, 31 which are longer and have a thinner cross-section for the first heating device so that the resistance is greater than that of the resistors of the second heating device.

In the two preceding embodiment variations, the heating elements of the first heating device and the heating elements of the second heating device are supplied with electricity simultaneously.

The de-icing device in accordance with the invention can also comprise at least one temperature sensor on said surface portion 8 of the blade so as to permit adjustment of the electric power of the heating elements of each of the heating devices. For example, it is possible to trigger the start-up of the de-icing device below a set value of a predefined temperature. The de-icing device in accordance with the invention can also comprise at least one frost sensor on said surface portion 8 of the blade so as to permit, for example, triggering of the start-up of the de-icing device. It is also possible to provide a means of controlling and regulating the de-icing device in open loop control or in closed loop control, taking into account the data relating to the temperature and/or frost.

The invention can comprise a large number of embodiment variants. In particular, it is possible to produce any type of repetitive or variable pattern for each of the first heating device and second heating device. Furthermore, it is also possible to vary the respective amounts of coverage of the first heating device and of the second heating device.

The invention claimed is:

1. A device for de-icing at least one surface portion of a rotor blade liable to be covered with a layer of ice, said device comprising:
   at least one first heating device adapted to permit detachment of at least part of said layer of ice in contact with said surface portion of the rotor blade, further comprising:
   at least one second heating device comprising heating elements that are electrical resistors extending facing only part of said surface portion so as to circumscribe at that location closed-contour zones of said surface portion, the second heating device extending in the form of at least one lattice, named second heating lattice, comprising cells, each cell of said second heating lattice defining a closed-contour zone, and in that:
the heating elements of the second heating device are adapted to cause breaking of the ice through said thickness of said ice layer,
the first heating device extends at least partly facing the inside of said closed-contour zones of said second heating device,
the closed-contour zones are circumscribed by the heating elements of the second heating device.

2. The device for de-icing according to claim 1, wherein the heating elements of the second heating device are filiform.

3. The device for de-icing according to claim 2, wherein said heating elements of the second heating device extend in a pattern selected from the group formed of polygons and closed curves.

4. The device for de-icing according to claim 2, wherein said heating elements of the second heating device extend in a pattern selected from the group formed of convex polygons.

5. The device for de-icing according to claim 2, wherein the first heating device is formed of a thin heating film.

6. The device for de-icing according to claim 1, wherein said heating elements of the second heating device extend in a pattern selected from the group formed of polygons and closed curves.

7. The device for de-icing according to claim 6, wherein said heating elements of the second heating device extend in a pattern selected from the group formed of convex polygons.

8. The device for de-icing according to claim 1, wherein said heating elements of the second heating device extend in a pattern selected from the group formed of convex polygons.

9. The device for de-icing according to claim 1, wherein the first heating device is formed of a thin heating film.

10. The device for de-icing according to claim 1, wherein each closed-contour zone occupies a predetermined surface and wherein said first heating device is in the form of at least one lattice of electrical resistors, named first heating lattice, comprising cells each having a surface smaller than the surface of each of the closed-contour zones of said second heating device.

11. The device for de-icing according to claim 10, wherein said second heating device comprises a supply of electricity for the heating elements at an electric power level, wherein said first heating device comprises a supply of electricity for the first heating lattice at an electric power level, and wherein the electric power dissipated per unit area of the second heating lattice is greater than the electric power dissipated per unit area of the first heating lattice.

12. A rotor blade, comprising at least one device for de-icing according to claim 1.

13. The blade according to claim 12, wherein the electric power dissipated per unit area by said first heating device varies depending on the distance between the heating elements of the second heating device and the leading edge.

14. A turbomachine rotor comprising at least one blade according to claim 12.

15. The turbomachine comprising at least one rotor according to claim 14.

16. An aircraft comprising at least one turbomachine according to claim 15.

17. The device for de-icing according to claim 1, wherein the closed-contour zones of said second heating device are adjacent to one another and separated from one another at least by said heating elements.

18. The device for de-icing according to claim 1, wherein the first heating device and the heating elements of the second heating device extend in at least one housing recessed into said surface portion, so that the outer surface of the blade is stripped of any overthickness.

19. The blade according to claim 12, wherein the electric power dissipated per unit area by said first heating device varies depending on the distance between the heating elements of the second heating device and the blade root.

* * * * *